US012743108B2

(12) United States Patent
Ichizuri

(10) Patent No.: US 12,743,108 B2
(45) Date of Patent: Sep. 22, 2026

(54) UNMANNED VEHICLE MANAGEMENT SYSTEM AND UNMANNED VEHICLE MANAGEMENT METHOD

(71) Applicant: Komatsu Ltd., Tokyo (JP)

(72) Inventor: Shogo Ichizuri, Tokyo (JP)

(73) Assignee: KOMATSU LTD., Tokyo (JP)

( * ) Notice: Subject to any disclaimer, the term of this patent is extended or adjusted under 35 U.S.C. 154(b) by 28 days.

(21) Appl. No.: 18/856,904

(22) PCT Filed: Aug. 8, 2023

(86) PCT No.: PCT/JP2023/028838
§ 371 (c)(1),
(2) Date: Oct. 15, 2024

(87) PCT Pub. No.: WO2024/034587
PCT Pub. Date: Feb. 15, 2024

(65) Prior Publication Data
US 2025/0251741 A1 Aug. 7, 2025

(30) Foreign Application Priority Data
Aug. 10, 2022 (JP) ................................ 2022-127843

(51) Int. Cl.
*G05D 1/692* (2024.01)
*E02F 3/28* (2006.01)
(Continued)

(52) U.S. Cl.
CPC ............... *G05D 1/692* (2024.01); *E02F 3/28* (2013.01); *E02F 9/261* (2013.01); *E02F 9/264* (2013.01);
(Continued)

(58) Field of Classification Search
CPC .. G05D 1/692; G05D 1/6987; G05D 2105/05; G05D 2107/73; G05D 2109/10;
(Continued)

(56) References Cited

U.S. PATENT DOCUMENTS 9,037,338 B2 5/2015 Osagawa et al.
9,595,196 B1 3/2017 Hiranaka
(Continued)

FOREIGN PATENT DOCUMENTS

JP 2012-113429 A 6/2012
JP 2015-68141 A 4/2015
(Continued)

OTHER PUBLICATIONS

Office Action dated Oct. 21, 2025, issued in the corresponding Australian patent application No. 2023323444.

*Primary Examiner* — Richard M Camby
(74) *Attorney, Agent, or Firm* — Troutman Pepper Locke LLP; James E. Armstrong, IV; Joshua L. Jones

(57) ABSTRACT

An unmanned vehicle management system includes a first unmanned vehicle including a target position sensor that detects a relative position with respect to a loader, a second unmanned vehicle including a dump body onto which a load is loaded by the loader, and a management device that manages travel of each of the first unmanned vehicle and the second unmanned vehicle.

18 Claims, 10 Drawing Sheets

(51) Int. Cl.

| | |
|---|---|
| ***E02F 9/26*** | (2006.01) |
| ***G05D 1/698*** | (2024.01) |
| *G05D 105/05* | (2024.01) |
| *G05D 107/70* | (2024.01) |

(52) U.S. Cl.
CPC ....... *G05D 1/6987* (2024.01); *G05D 2105/05* (2024.01); *G05D 2107/73* (2024.01)

(58) Field of Classification Search
CPC ....... G05D 2111/17; G05D 1/242; E02F 3/28; E02F 9/261; E02F 9/264; E02F 9/205; E02F 9/2054; E02F 9/26; E02F 9/262; G08G 1/09; G08G 1/16
See application file for complete search history.

(56) References Cited

U.S. PATENT DOCUMENTS

| | | | | |
|---|---|---|---|---|
| 10,801,852 | B2 | 10/2020 | Sakai et al. | |
| 11,454,980 | B2 | 9/2022 | Takeda et al. | |
| 2013/0054133 | A1* | 2/2013 | Lewis | G01C 21/3667 701/423 |
| 2018/0074201 | A1* | 3/2018 | Sakai | G01S 17/06 |
| 2023/0229169 | A1* | 7/2023 | Osagawa | G05D 1/0291 701/25 |
| 2023/0341858 | A1* | 10/2023 | Hiranaka | G05D 1/0214 |

FOREIGN PATENT DOCUMENTS

| | | | |
|---|---|---|---|
| JP | 201716477 | A | 1/2017 |
| JP | 2018-49572 | A | 3/2018 |
| WO | 2016/039489 | A1 | 3/2016 |
| WO | 2017/130418 | A1 | 8/2017 |

* cited by examiner 1
2
2
2
2
2
2
3
4
4
5
5
6
7
8
8
32
32

14
13C
12
11
13
2
203
13A
201
9
202
20
703
703A
703B
704B(704)
7
13B
10
704A
(704)
701
703C
702
704C(704)

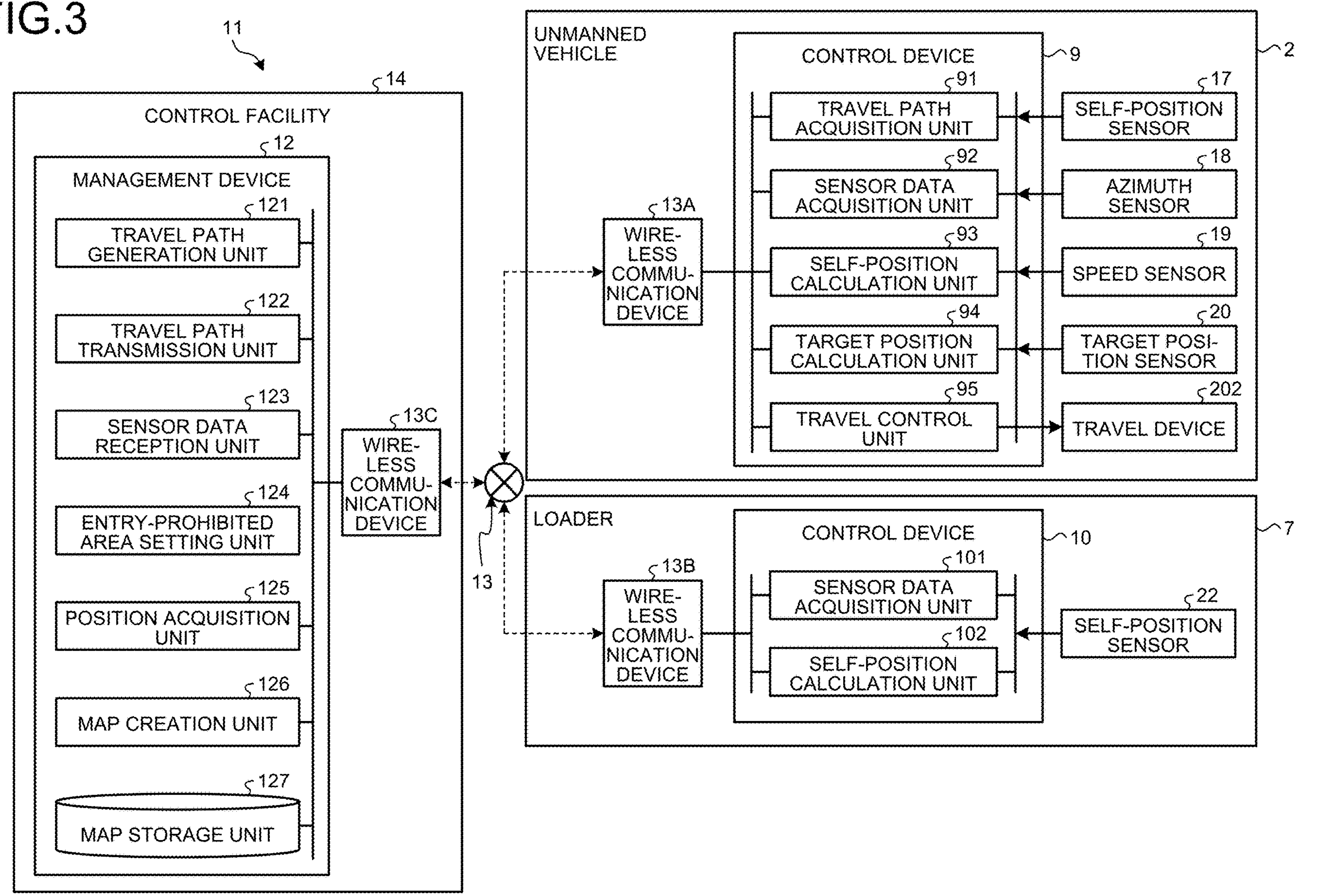
FIG.3
11
CONTROL FACILITY
14
MANAGEMENT DEVICE
12
TRAVEL PATH GENERATION UNIT
121
TRAVEL PATH TRANSMISSION UNIT
122
SENSOR DATA RECEPTION UNIT
123
ENTRY-PROHIBITED AREA SETTING UNIT
124
POSITION ACQUISITION UNIT
125
MAP CREATION UNIT
126
MAP STORAGE UNIT
127
WIRE-LESS COMMU-NICATION DEVICE
13C
13
UNMANNED VEHICLE
2
WIRE-LESS COMMU-NICATION DEVICE
13A
CONTROL DEVICE
9
TRAVEL PATH ACQUISITION UNIT
91
SENSOR DATA ACQUISITION UNIT
92
SELF-POSITION CALCULATION UNIT
93
TARGET POSITION CALCULATION UNIT
94
TRAVEL CONTROL UNIT
95
SELF-POSITION SENSOR
17
AZIMUTH SENSOR
18
SPEED SENSOR
19
TARGET POSI-TION SENSOR
20
TRAVEL DEVICE
202
LOADER
7
WIRE-LESS COMMU-NICATION DEVICE
13B
CONTROL DEVICE
10
SENSOR DATA ACQUISITION UNIT
101
SELF-POSITION CALCULATION UNIT
102
SELF-POSITION SENSOR
22

UNMANNED VEHICLE MANAGEMENT SYSTEM AND UNMANNED VEHICLE MANAGEMENT METHOD

FIELD

The present disclosure relates to an unmanned vehicle management system and an unmanned vehicle management method.

BACKGROUND

Unmanned vehicles operate in a wide-area work site such as a mine. An unmanned vehicle travels in the work site based on a position detected using a global navigation satellite system (GNSS). For example, for a situation where the GNSS becomes unavailable due to ionospheric scintillation or the like, a technique of causing the unmanned vehicle to travel using a scan matching navigation (SMN) method as disclosed in Patent Literature 1 is known. The scan matching navigation refers to navigation for causing the unmanned vehicle to travel while matching map data of the work site and detection data of a laser sensor mounted on the unmanned vehicle.

CITATION LIST

Patent Literature

Patent Literature 1: WO 2017/130418 A1

SUMMARY

Technical Problem

When loading loads onto a dump body of the unmanned vehicle using a loader, it is necessary to acquire a position of the loader. In order to suppress a decrease in productivity at the work site, a technique capable of acquiring the position of the loader even when the GNSS is unavailable is desired.

An object of the present disclosure is to suppress a decrease in productivity at a work site where unmanned vehicles operate.

Solution to Problem

In order to achieve an aspect of the present invention, an unmanned vehicle management system comprises: a first unmanned vehicle including a target position sensor that detects a relative position with respect to a loader; a second unmanned vehicle including a dump body onto which a load is loaded by the loader; and a management device that manages travel of each of the first unmanned vehicle and the second unmanned vehicle.

Advantageous Effects of Invention

According to the present disclosure, the decrease in productivity at the work site where the unmanned vehicles operate is suppressed.

BRIEF DESCRIPTION OF DRAWINGS

FIG. 3 is a block diagram illustrating the management system for the work site according to the embodiment.

FIG. 10 is a schematic diagram for explaining an operation of the unmanned vehicle according to another embodiment in the loading area when the GNSS is unavailable.

DESCRIPTION OF EMBODIMENTS

Hereinafter, embodiments according to the present disclosure will be described with reference to the drawings, but the present disclosure is not limited to the embodiments. Components of the embodiments to be described below can be combined as appropriate. In addition, some components may not be used.

Work Site

Figure 1:
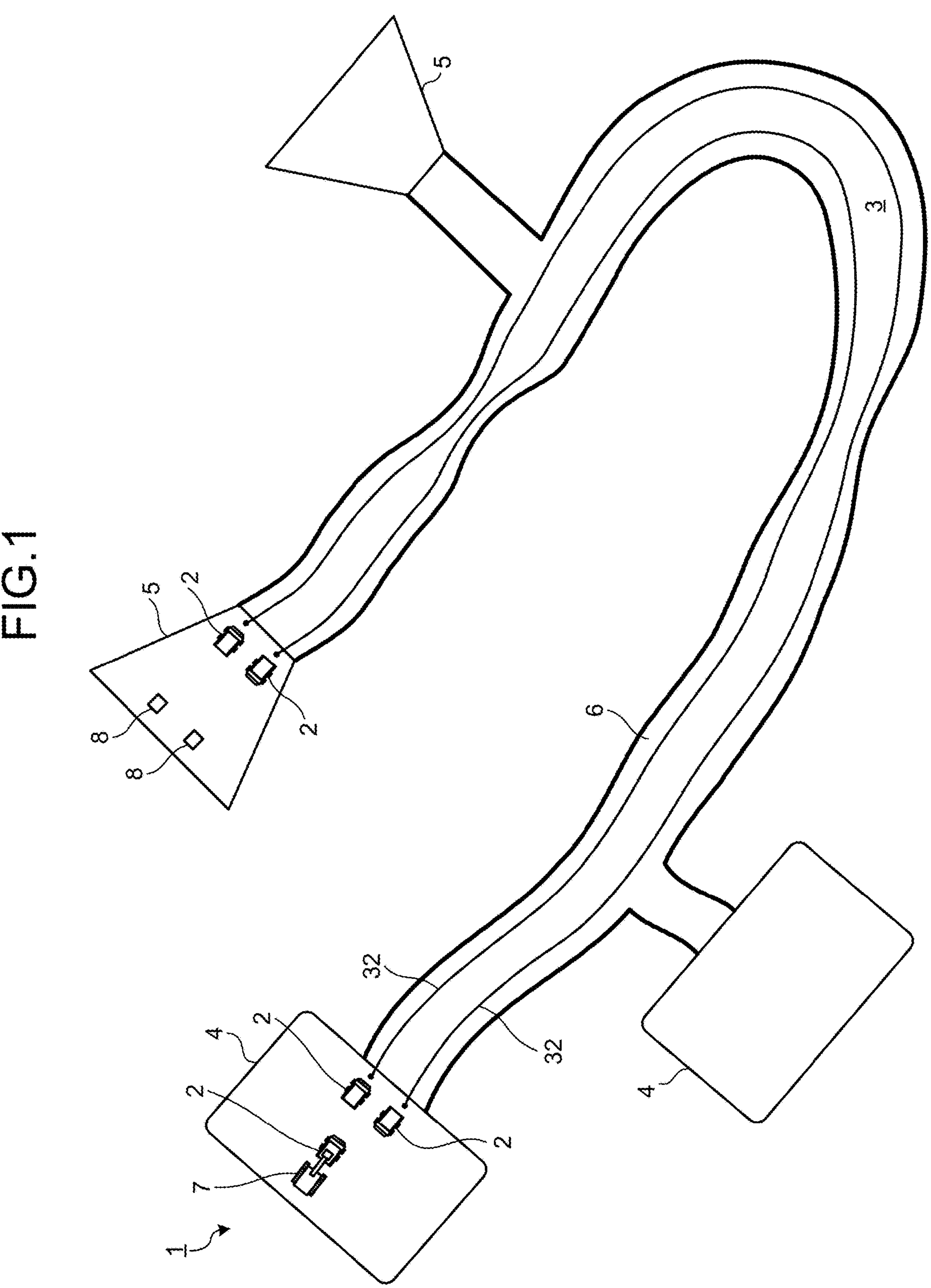
FIG. 1 is a schematic diagram illustrating a work site of an unmanned vehicle according to an embodiment.

FIG. 1 is a schematic diagram illustrating a work site 1 of an unmanned vehicle 2 according to an embodiment. In the embodiment, the work site 1 is a mine. The mine refers to a place or a business premise where minerals are mined. Examples of the mine include a metal mine for mining metal, a non-metal mine for mining limestone, and a coal mine for mining coal. In the work site 1, a plurality of the unmanned vehicles 2 operates.

The unmanned vehicle 2 refers to a work vehicle that operates in an unmanned manner without depending on the driving operation of a driver. In the embodiment, the unmanned vehicle 2 is an unmanned dump truck that travels in the work site 1 in an unmanned manner and transports loads. Examples of the loads to be transported by the unmanned vehicle 2 includes an excavated object mined at the work site 1.

A travel area 3 is set in the work site 1. The travel area 3 refers to an area in which the unmanned vehicle 2 can travel. The travel area 3 includes a loading area 4, a discharging area 5, and a travel road 6.

The loading area 4 refers to an area in which loading work of loading loads onto the unmanned vehicle 2 is performed. In the loading area 4, a loader 7 operates.

The discharging area 5 refers to an area in which discharging work of discharging loads from the unmanned vehicle 2 is performed. Crushers 8 are arranged in the discharging area 5.

The travel road 6 refers to an area in which the unmanned vehicle 2 heading to at least one of the loading area 4 and the discharging area 5 travels. The travel road 6 is provided so as to connect the loading area 4 and the discharging area 5.

The unmanned vehicle 2 travels on the travel road 6 so as to shuttle between the loading area 4 and the discharging area 5.

Management System

Figure 2:
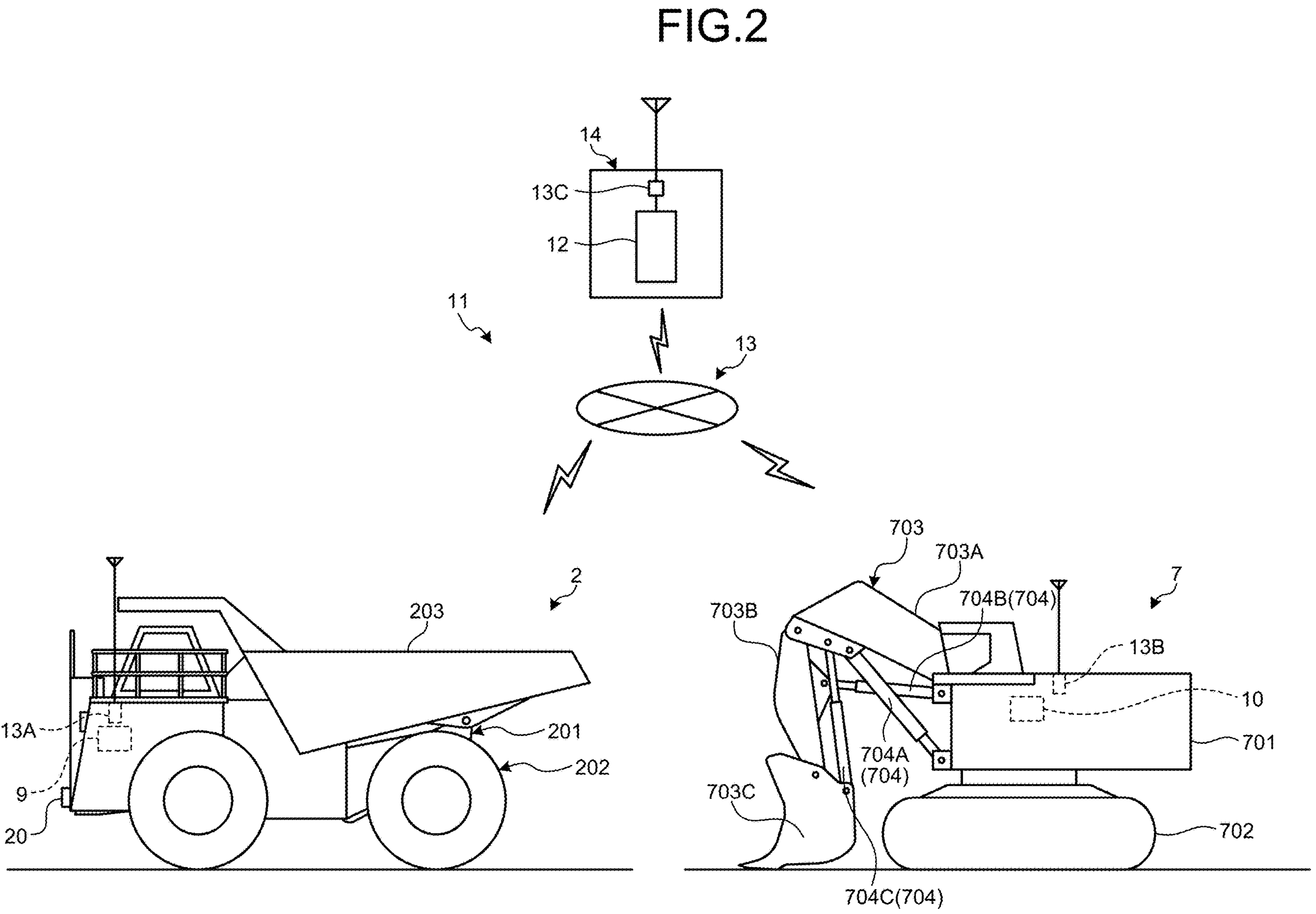
FIG. 2 is a schematic diagram illustrating a management system for the work site according to the embodiment.

FIG. 2 is a schematic diagram illustrating a management system 11 for the work site 1 according to the embodiment. The management system 11 includes a management device 12 and a communication system 13.

The management device 12 includes a computer system. The management device 12 is arranged outside the unmanned vehicle 2 and the loader 7. The management device 12 is installed in a control facility 14 of the work site 1. The management device 12 manages the work site 1. The management device 12 manages at least the unmanned vehicle 2 and the loader 7. In the work site 1, the plurality of unmanned vehicles 2 operates. The management device 12 manages the travel of each of the plurality of unmanned vehicles 2.

Examples of the communication system 13 include the Internet, a mobile phone communication network, a satellite communication network, and a local area network (LAN). Examples of the local area network include Wi-Fi (registered trademark), which is one standard of a wireless LAN.

The unmanned vehicle 2 is an unmanned dump truck. The unmanned vehicle 2 includes a vehicle body 201, a travel device 202, a dump body 203, a control device 9, and a wireless communication device 13A. The control device 9 includes a computer system. The wireless communication device 13A is connected to the control device 9.

The loader 7 is a manned vehicle operated by an operator. The loader 7 is a hydraulic excavator. The loader 7 includes a turning body 701, a travel device 702, a working equipment 703, a working equipment cylinder 704, a control device 10, and a wireless communication device 13B. The control device 10 includes a computer system. The wireless communication device 13B is connected to the control device 10.

The communication system 13 includes the wireless communication device 13A connected to the control device 9, the wireless communication device 13B connected to the control device 10, and a wireless communication device 13C connected to the management device 12. The management device 12 and the control device 9 of the unmanned vehicle 2 wirelessly communicate with each other via the communication system 13. The management device 12 and the control device 10 of the loader 7 wirelessly communicate with each other via the communication system 13.

The vehicle body 201 includes a vehicle body frame. The vehicle body 201 is supported by the travel device 202. The travel device 202 travels while supporting the vehicle body 201. The travel device 202 includes wheels, tires mounted on the wheels, an engine, a brake device, and a steering device. The dump body 203 is a member onto which loads are loaded by the loader 7. The dump body 203 is supported by the vehicle body 201. The dump body 203 performs a dumping operation and a lowering operation. The dumping operation refers to an operation of separating the dump body 203 from the vehicle body 201 and tilting the dump body in the dumping direction. The lowering operation refers to an operation of bringing the dump body 203 close to the vehicle body 201. When the loading work is performed, the dump body 203 performs the lowering operation. When the discharging work is performed, the dump body 203 performs the dumping operation.

The turning body 701 turns while being supported by the travel device 702. The travel device 702 includes a pair of crawler tracks. The travel device 702 allows the loader 7 to move in the work site 1 including the loading area 4. The working equipment 703 is supported by the turning body 701. The working equipment 703 includes a boom 703A rotatably coupled to the turning body 701, an arm 703B rotatably coupled to the boom 703A, and a bucket 703C rotatably coupled to the arm 703B. The working equipment cylinder 704 causes the working equipment 703 to operate. The working equipment cylinder 704 is a hydraulic cylinder. The working equipment cylinder 704 includes a boom cylinder 704A that causes the boom 703A to perform the raising operation and the lowering operation, an arm cylinder 704B that causes the arm 703B to perform the pulling operation and the pushing operation, and a bucket cylinder 704C that causes the bucket 703C to performs the tilting operation and the dumping operation.

FIG. 3 is a block diagram illustrating the management system 11 for the work site 1 according to the embodiment. The unmanned vehicle 2 includes the control device 9, the wireless communication device 13A, a self-position sensor 17, an azimuth sensor 18, a speed sensor 19, a target position sensor 20, and the travel device 202. Each of the wireless communication device 13A, the self-position sensor 17, the azimuth sensor 18, the speed sensor 19, and the target position sensor 20 can communicate with the control device 9. The travel device 202 is controlled by the control device 9.

The self-position sensor 17 detects the position of the unmanned vehicle 2. The position of the unmanned vehicle 2 is detected using a global navigation satellite system (GNSS). The global navigation satellite system includes the global positioning system (GPS). The global navigation satellite system detects the position in the global coordinate system defined by coordinate data of latitude, longitude, and altitude. The global coordinate system refers to a coordinate system fixed to the earth. The self-position sensor 17 includes a GNSS receiver and detects the position of the unmanned vehicle 2 in the global coordinate system.

In the following description, the position in the global coordinate system is referred to as an absolute position as appropriate. In addition, in the following description, the position detected using the GNSS is referred to as a GNSS position as appropriate.

The azimuth sensor 18 detects the azimuth of the unmanned vehicle 2. The azimuth of the unmanned vehicle 2 includes the yaw angle of the unmanned vehicle 2. When an axis extending in the vertical direction at the center of gravity of the vehicle body 201 is set as the yaw axis, the yaw angle refers to a rotation angle around the yaw axis. An example of the azimuth sensor 18 includes a gyro sensor.

The speed sensor 19 detects the travel speed of the unmanned vehicle 2. An example of the speed sensor 19 includes a pulse sensor that detects the rotation of the wheels of the unmanned vehicle 2.

The target position sensor 20 detects the relative position between the unmanned vehicle 2 and a target object present around the unmanned vehicle 2. The target position sensor 20 detects a target object in a non-contact manner. In the embodiment, the target position sensor 20 includes a laser sensor (light detection and ranging (LIDAR)). Note that the target position sensor 20 may include a radar sensor (radio detection and ranging (RADAR)). Note that the target position sensor 20 may be an imaging device that images a target object and detects the relative position with respect to the target object. As illustrated in FIG. 2, the target position sensor 20 is arranged at least at the front portion of the vehicle body 201. The target position sensor 20 may be arranged at the rear portion of the vehicle body 201, or may be arranged at each of the front portion and the rear portion of the vehicle body 201.

In the embodiment, the target of which the relative position is detected by the target position sensor 20 includes the loader 7. The target position sensor 20 detects the relative position with respect to the loader 7. In addition, the target of which the relative position is detected by the target position sensor 20 includes landforms and structures of the work site 1.

The loader 7 includes the control device 10, the wireless communication device 13B, and a self-position sensor 22. Each of the wireless communication device 13B and the self-position sensor 22 can communicate with the control device 10.

The self-position sensor 22 detects the position of the loader 7. The self-position sensor 22 includes a GNSS receiver and detects the position of the loader 7 in the global coordinate system.

The management device 12 includes a travel path generation unit 121, a travel path transmission unit 122, a sensor data reception unit 123, an entry-prohibited area setting unit 124, a position acquisition unit 125, a map creation unit 126, and a map storage unit 127.

The travel path generation unit 121 generates travel data indicating a travel condition of the unmanned vehicle 2. The travel path transmission unit 122 transmits the travel data to the unmanned vehicle 2 via the communication system 13.

The sensor data reception unit 123 receives at least detection data of the self-position sensor 22 of the loader 7 via the communication system 13. In the embodiment, the sensor data reception unit 123 can receive each of detection data of the self-position sensor 17, detection data of the azimuth sensor 18, detection data of the speed sensor 19, and detection data by the target position sensor 20 of the unmanned vehicle 2 via the communication system 13.

The entry-prohibited area setting unit 124 sets, for the loader 7, an entry-prohibited area 50 in which the unmanned vehicle 2 is prohibited from entering.

The position acquisition unit 125 acquires the position of the target object present around the unmanned vehicle 2 from the control device 9 of the unmanned vehicle 2 via the communication system 13. In the embodiment, the position acquisition unit 125 acquires at least the position of the loader 7 from the control device 9 of the unmanned vehicle 2 via the communication system 13.

The map creation unit 126 creates map data of the work site 1 based on the detection data of the self-position sensor 17 and the detection data of the target position sensor 20 of the unmanned vehicle 2. The map data of the work site 1 is three-dimensional map data of the work site 1 in the global coordinate system. The target position sensor 20 can detect the three-dimensional data of the work site 1. The three-dimensional data of the work site 1 includes three-dimensional data of the landforms of the work site 1 and three-dimensional data of the structures of the work site 1. The self-position sensor 17 can detect the position of the target position sensor 20 while the target position sensor 20 is detecting the work site 1. The detection data of the self-position sensor 17 and the detection data of the target position sensor 20 are received by the sensor data reception unit 123. Thus, the map creation unit 126 can create the three-dimensional map data of the work site 1 based on the detection data of the self-position sensor 17 and the detection data of the target position sensor 20. The map storage unit 127 stores the map data of the work site 1 created by the map creation unit 126.

The control device 9 includes a travel path acquisition unit 91, a sensor data acquisition unit 92, a self-position calculation unit 93, a target position calculation unit 94, and a travel control unit 95.

The travel path acquisition unit 91 acquires the travel data of the unmanned vehicle 2 generated by the travel path generation unit 121 from the management device 12 via the communication system 13.

The sensor data acquisition unit 92 acquires the detection data of the self-position sensor 17, the detection data of the azimuth sensor 18, the detection data of the speed sensor 19, and the detection data of the target position sensor 20.

The self-position calculation unit 93 calculates the position (absolute position) of the unmanned vehicle 2 based on the detection data of the self-position sensor 17 acquired by the sensor data acquisition unit 92.

The target position calculation unit 94 calculates the position of the target object based on the detection data acquired by the sensor data acquisition unit 92. In the embodiment, the target position calculation unit 94 calculates the position of the target object in the global coordinate system based on the detection data of the self-position sensor 17 and the detection data of the target position sensor 20. As described above, the self-position sensor 17 detects the position of the unmanned vehicle 2 in the global coordinate system. The target position sensor 20 detects the relative position between the unmanned vehicle 2 and the target object. The target position calculation unit 94 can calculate the absolute position of the target object based on the absolute position of the unmanned vehicle 2 and the relative position between the unmanned vehicle 2 and the target object.

The travel control unit 95 controls the travel device 202 based on the travel data of the unmanned vehicle 2 acquired by the travel path acquisition unit 91 and the detection data acquired by the sensor data acquisition unit 92.

The control device 10 includes a sensor data acquisition unit 101 and a self-position calculation unit 102.

The sensor data acquisition unit 101 acquires the detection data of the self-position sensor 22.

The self-position calculation unit 102 calculates the position of the loader 7 based on the detection data of the self-position sensor 22 acquired by the sensor data acquisition unit 101.

Computer System

Figure 4:
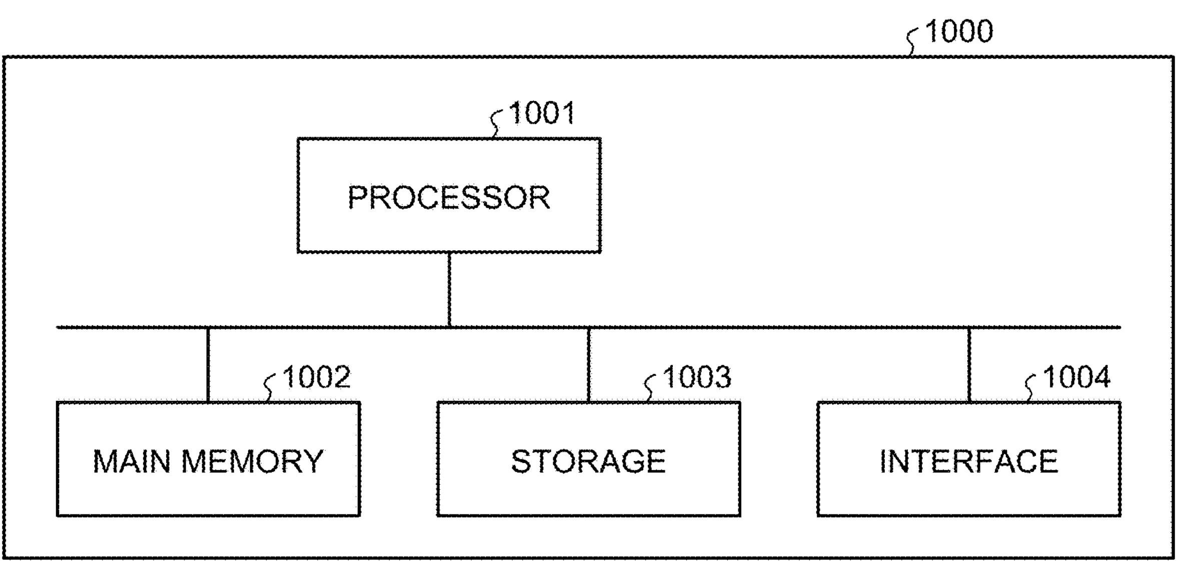
FIG. 4 is a hardware configuration diagram of a management device according to the embodiment.

FIG. 4 is a hardware configuration diagram of the management device 12 according to the embodiment. The management device 12 includes a computer system 1000. The computer system 1000 includes a processor 1001 such as a central processing unit (CPU), a main memory 1002 including a nonvolatile memory such as a read only memory (ROM) and a volatile memory such as a random access memory (RAM), a storage 1003, and an interface 1004 including an input/output circuit. Functions of the management device 12 described above are stored in the storage 1003 as computer programs. The processor 1001 reads the computer programs from the storage 1003 to load the computer programs into the main memory 1002, and executes the above-described processing according to the programs. Note that the computer programs may be distributed to the computer system 1000 via a network.

Each of the control device 9 and the control device 10 includes the computer system 1000 as illustrated in FIG. 4. Functions of each of the control device 9 and the control device 10 are stored in the storage 1003 as computer programs.

Travel Data

Figure 5:
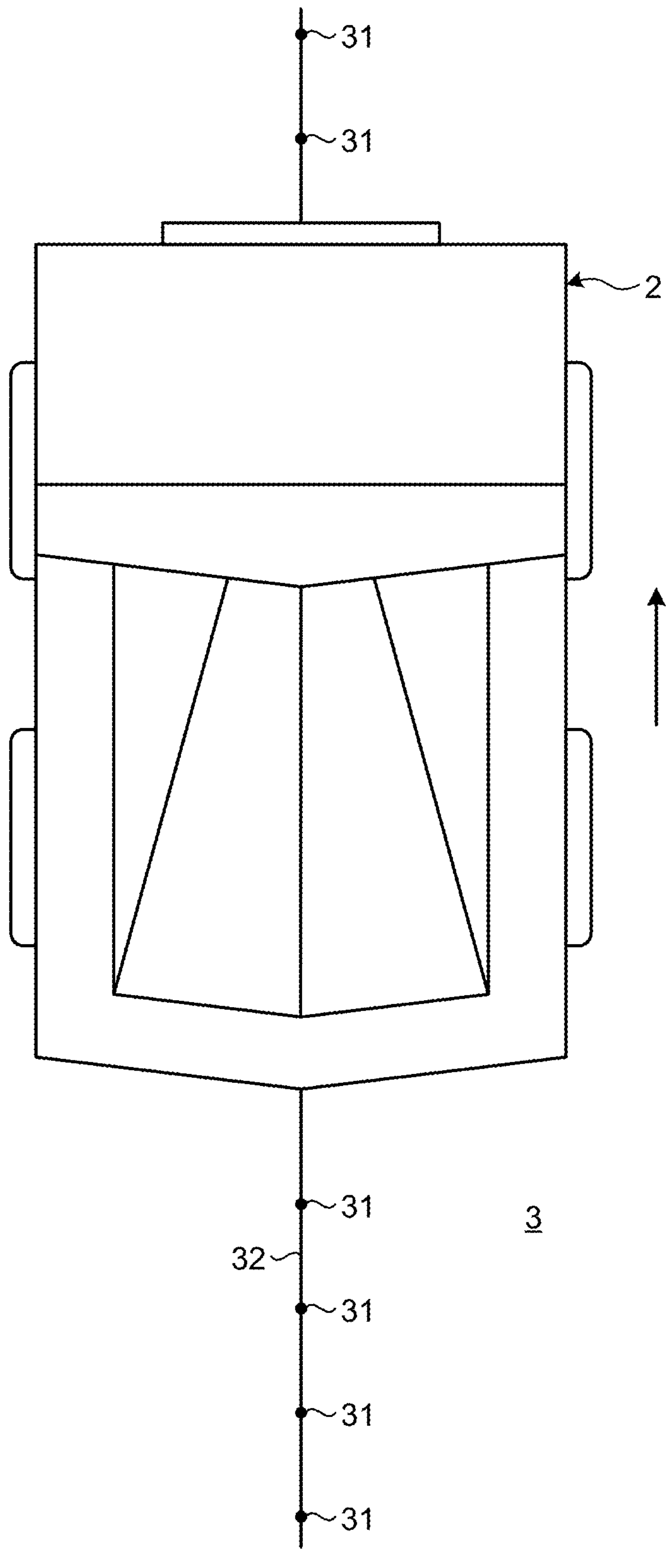
FIG. 5 is a schematic diagram for explaining travel data of the unmanned vehicle according to the embodiment.

FIG. 5 is a schematic diagram for explaining the travel data of the unmanned vehicle 2 according to the embodiment.

The travel data of the unmanned vehicle 2 defines the travel condition of the unmanned vehicle 2. The travel data of the unmanned vehicle 2 includes travel points 31, a travel path 32, a target position of the unmanned vehicle 2, a target azimuth of the unmanned vehicle 2, and a target travel speed of the unmanned vehicle 2. The travel data of the unmanned vehicle 2 including the travel path 32 is generated by the travel path generation unit 121.

A plurality of the travel points 31 is set in the travel area 3 in the work site 1. The travel points 31 defines the target position of the unmanned vehicle 2. The target azimuth of the unmanned vehicle 2 and the target travel speed of the unmanned vehicle 2 are set at each of the plurality of travel points 31. The plurality of travel points 31 is set at intervals. The interval between the travel points 31 may be uniform or non-uniform.

The travel path 32 refers to a virtual line indicating a target travel route of the unmanned vehicle 2. The travel path 32 is defined by a trajectory passing through the plurality of travel points 31. The unmanned vehicle 2 travels in the travel area 3 according to the travel path 32. The unmanned vehicle 2 travels such that the center of the unmanned vehicle 2 in the vehicle width direction of the unmanned vehicle 2 coincides with the travel path 32.

The target position of the unmanned vehicle 2 refers to a target position of the unmanned vehicle 2 when passing through the travel point 31. The target position of the unmanned vehicle 2 may be defined in a local coordinate system of the unmanned vehicle 2 or may be specified in the global coordinate system.

The target azimuth of the unmanned vehicle 2 refers to a target azimuth of the unmanned vehicle 2 when passing through the travel point 31.

The target travel speed of the unmanned vehicle 2 refers to a target travel speed of the unmanned vehicle 2 when passing through the travel point 31.

Travel Control of Unmanned Vehicle

When the GNSS is available, the travel control unit 95 controls the travel device 202 to cause the unmanned vehicle 2 to travel according to the travel path 32 based on the travel data of the unmanned vehicle 2 and the detection data calculated by the self-position calculation unit 93.

The travel control unit 95 controls the travel device 202 to reduce a deviation between a detection position of the unmanned vehicle 2 detected by the self-position sensor 17 when passing through the travel point 31 and the target position of the unmanned vehicle 2 set at the travel point 31.

The travel control unit 95 controls the travel device 202 to reduce a deviation between the detection azimuth of the unmanned vehicle 2 detected by the azimuth sensor 18 when passing through the travel point 31 and the target azimuth of the unmanned vehicle 2 set at the travel point 31.

The travel control unit 95 controls the travel device 202 to reduce a deviation between the detection travel speed of the unmanned vehicle 2 detected by the speed sensor 19 when passing through the travel point 31 and the target travel speed of the unmanned vehicle 2 set at the travel point 31.

For example, in some cases, the GNSS is unavailable due to ionospheric scintillation or the like. When the GNSS is unavailable, the travel control unit 95 causes the unmanned vehicle 2 to travel using a scan matching navigation (SMN) method. The self-position calculation unit 93 matches the map data of the work site 1 stored in the map storage unit 127 and the detection data of the target position sensor 20 acquired by the sensor data acquisition unit 92 to calculate the position of the unmanned vehicle 2. As described above, the map data of the work site 1 is defined in the global coordinate system. The self-position calculation unit 93 can calculate the position of the unmanned vehicle 2 by matching the map data and the detection data of the target position sensor 20 and calculating the position of the map data that coincides with the detection data of the target position sensor 20.

In the following description, the position calculated based on the matching of the map data of the work site 1 and the detection data of the target position sensor 20 is referred to as a matching position as appropriate. The matching position of the unmanned vehicle 2 is an absolute position defined in the global coordinate system. The travel control unit 95 controls the travel device 202 to reduce a deviation between the matching position of the unmanned vehicle 2 calculated by the self-position calculation unit 93 and the target position of the unmanned vehicle 2 set at the travel point 31.

Operation of Unmanned Vehicle in Loading Area When GNSS is Available

Figure 6:
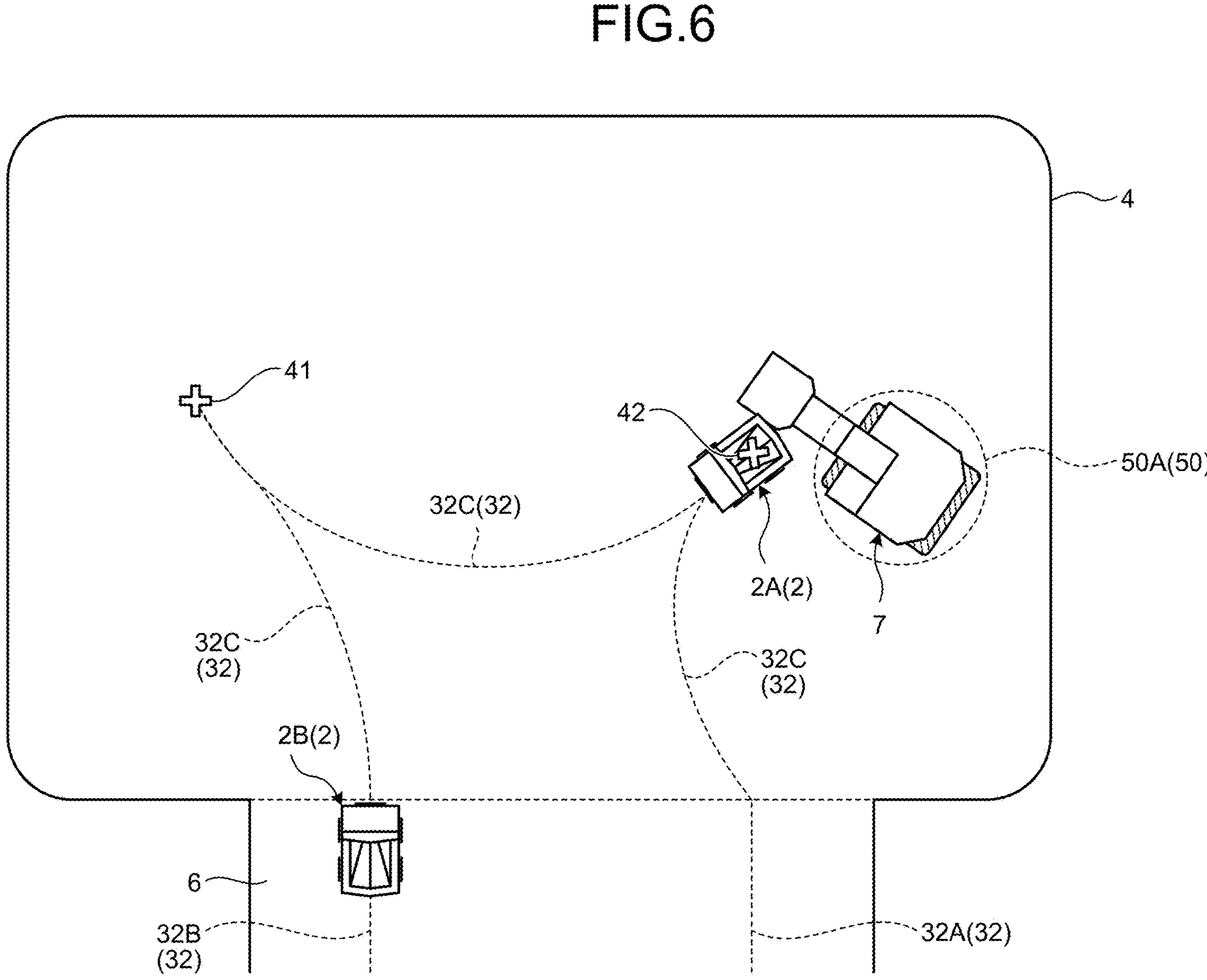
FIG. 6 is a schematic diagram for explaining an operation of the unmanned vehicle according to the embodiment in a loading area when a GNSS is available.

FIG. 6 is a schematic diagram for explaining an operation of the unmanned vehicles 2 according to the embodiment in the loading area 4 when the GNSS is available. The loading work is performed in the loading area 4. The loader 7 is arranged in the loading area 4. The travel road 6 is connected to the loading area 4. A first travel path 32A and a second travel path 32B are set on the travel road 6. A third travel path 32C is set in the loading area 4. The unmanned vehicle 2 travels based on the GNSS position indicating the detection data of the self-position sensor 17. The unmanned vehicle 2 travels from the loading area 4 to the discharging area 5 according to the first travel path 32A, and travels from the discharging area 5 to the loading area 4 according to the second travel path 32B.

The travel path generation unit 121 sets a switchback point 41 in the loading area 4. In addition, the travel path generation unit 121 sets a loading point 42 in the loading area 4. The switchback point 41 refers to a target position at which the unmanned vehicle 2 is switched back. The loading point 42 refers to a target position of the unmanned vehicle 2 when the loading work is performed by the loader 7. The switchback refers to the operation in which the unmanned vehicle 2 that is moving forward changes its traveling direction and moves backward to enter the loading point 42. Note that at least one of the switchback point 41 and the loading point 42 may be set by the driver of the loader 7. The driver of the loader 7 can operate an operation device mounted on the loader 7 to set at least one of the switchback point 41 and the loading point 42.

The entry-prohibited area setting unit 124 sets, for the loader 7, an entry-prohibited area 50 in which the unmanned vehicle 2 is prohibited from entering. The entry-prohibited area 50 is set so as to surround the turning body 701 of the loader 7. The unmanned vehicle 2 cannot enter the inside of the entry-prohibited area 50. The loading point 42 is set outside the entry-prohibited area 50. Due to the entry-prohibited area 50, the contact between the unmanned vehicle 2 and the loader 7 is suppressed.

The unmanned vehicle 2 enters the loading area 4 from the travel road 6. The unmanned vehicle 2 moves forward to enter the loading area 4. The unmanned vehicle 2 travels in the loading area 4 according to the third travel path 32C. The unmanned vehicle 2 that has entered the loading area 4 moves forward to enter the switchback point 41, and after stopping at the switchback point 41, the unmanned vehicle 2 moves backward to enter the loading point 42. The unmanned vehicle 2 that has entered the loading point 42 stops at the loading point 42. Onto the unmanned vehicle 2 arranged at the loading point 42, the loading work is performed. The unmanned vehicle 2 after the completion of the loading work moves forward to leave the loading point 42. The unmanned vehicle 2 that has left the loading point 42 leaves the loading area 4 for the travel road 6.

Operation of Unmanned Vehicle in Loading Area When GNSS is Unavailable

Figure 7:
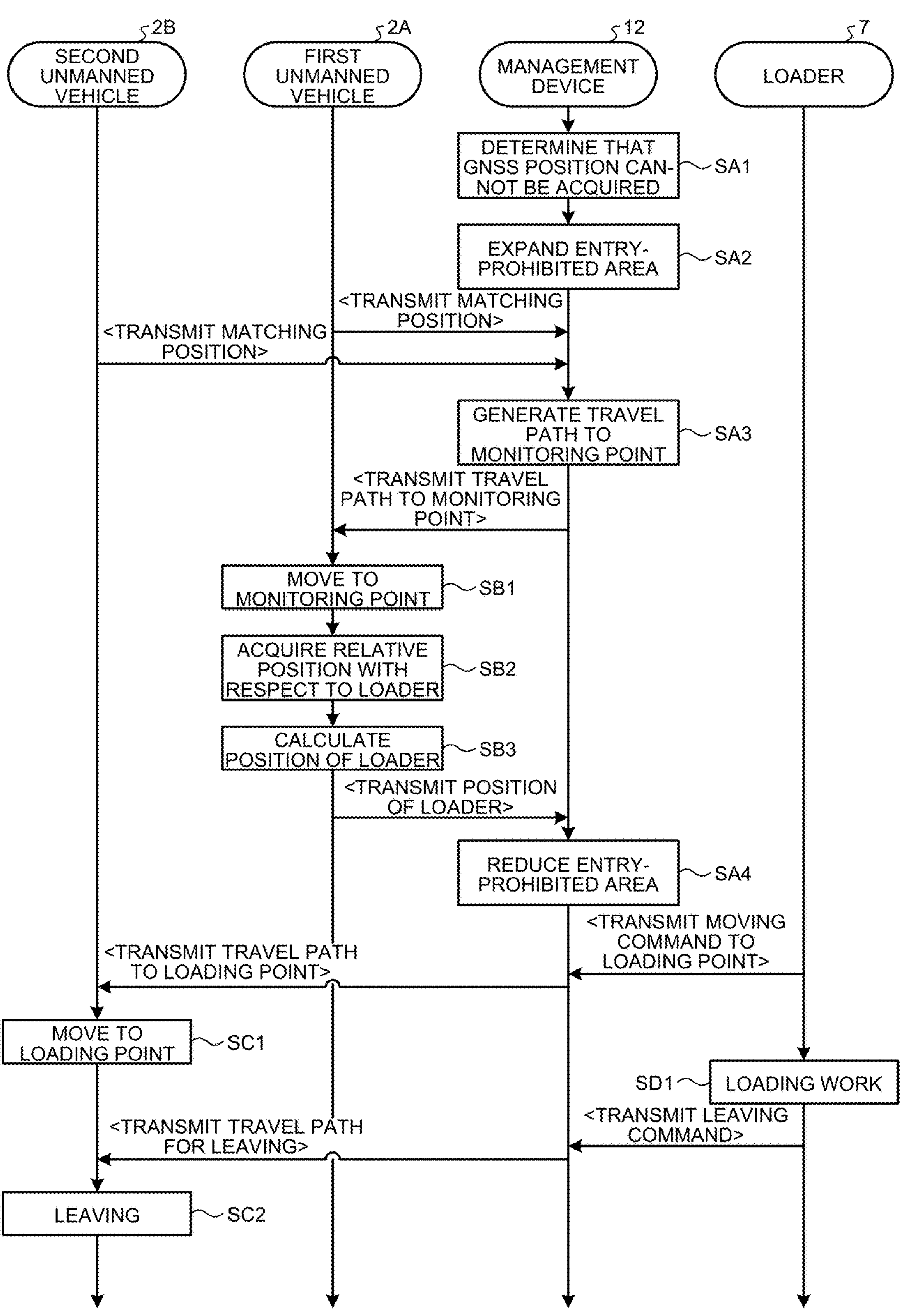
FIG. 7 is a flowchart illustrating processing of the management system according to the embodiment when the GNSS is unavailable.
Figure 8:
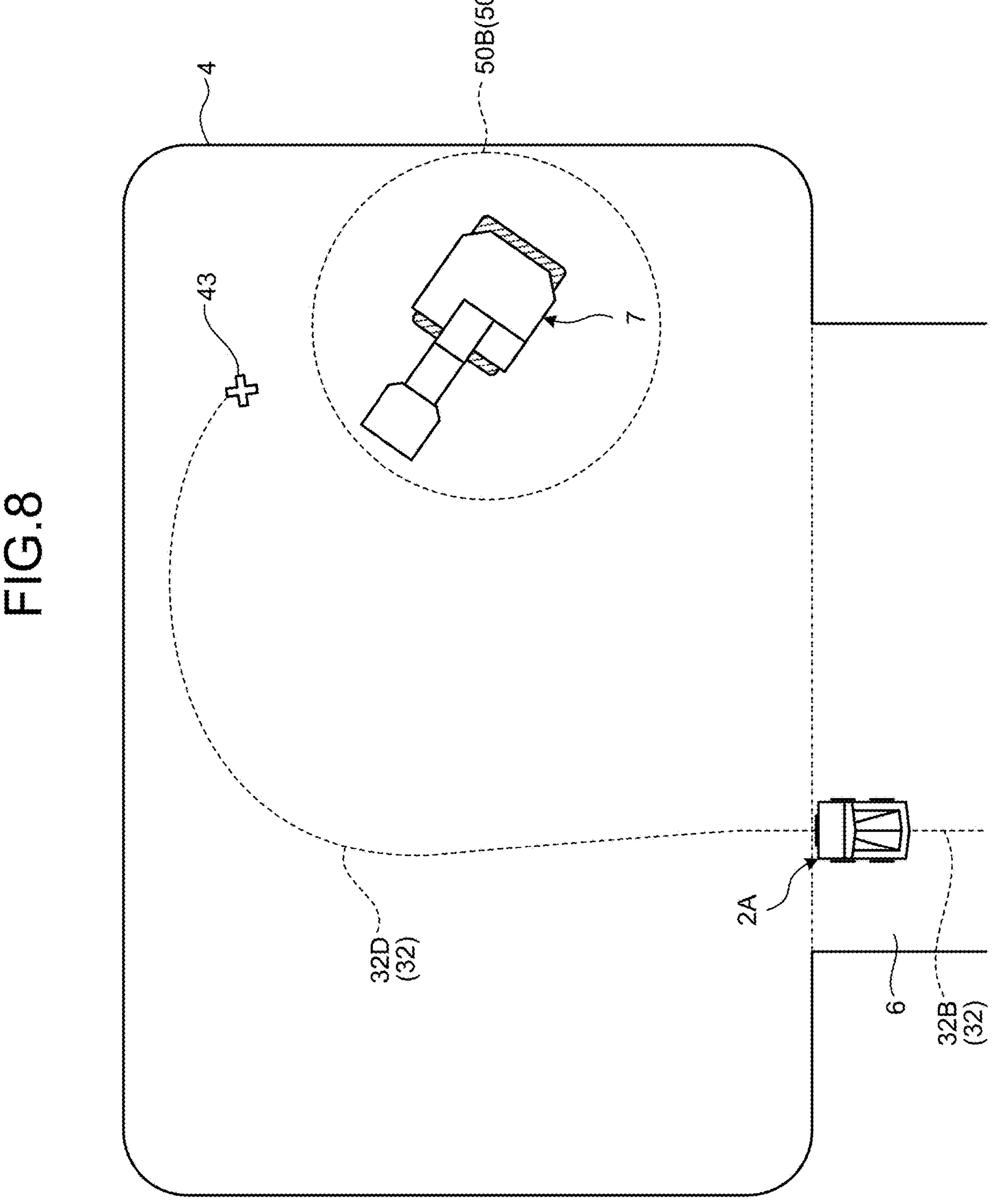
FIG. 8 is a schematic diagram for explaining an operation of the unmanned vehicle according to the embodiment in the loading area when the GNSS is unavailable.
Figure 9:
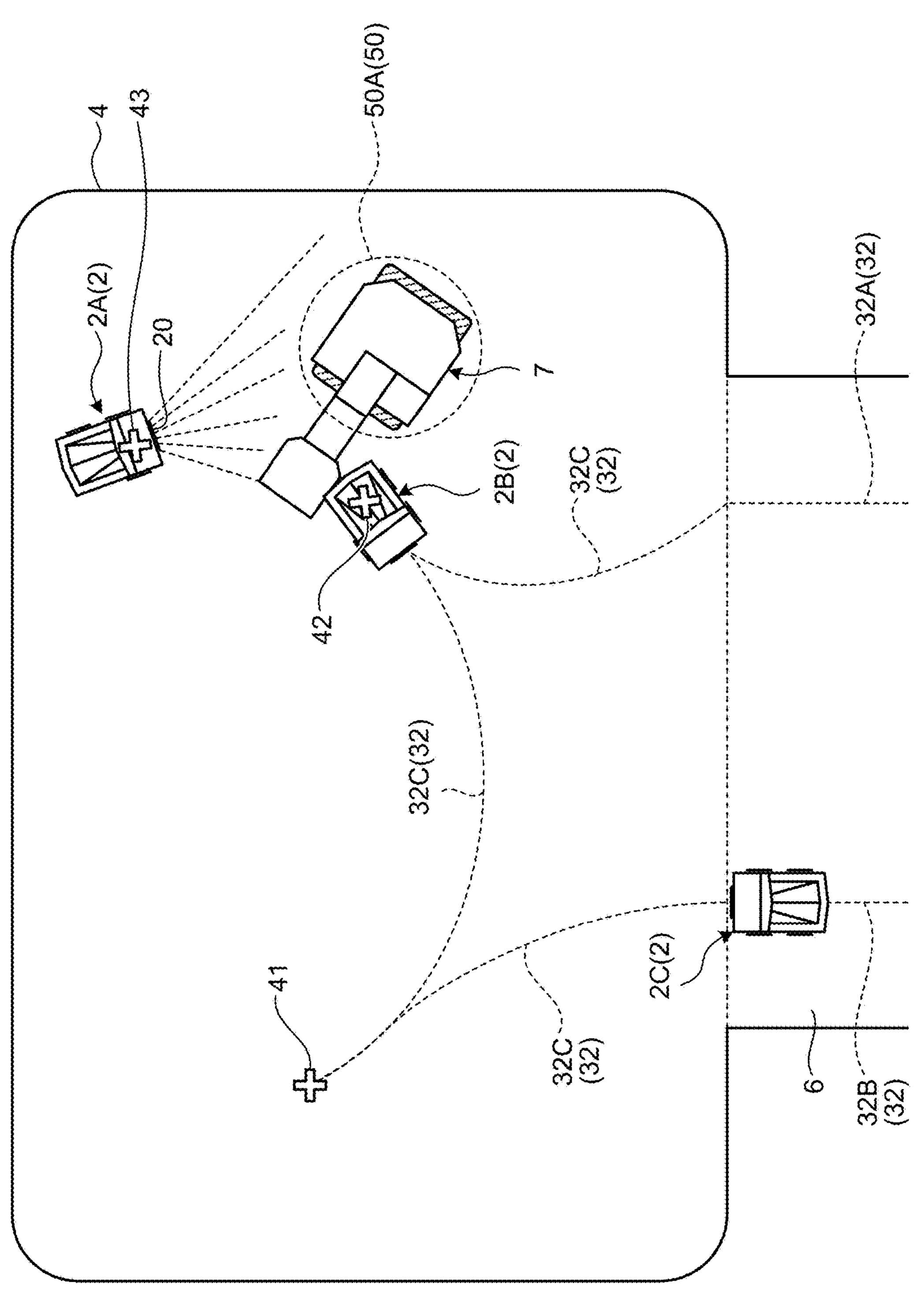
FIG. 9 is a schematic diagram for explaining an operation of the unmanned vehicle according to the embodiment in the loading area when the GNSS is unavailable.

FIG. 7 is a flowchart illustrating processing of the management system 11 according to the embodiment when the GNSS is unavailable. Each of FIG. 8 and FIG. 9 is a schematic diagram for explaining an operation of the unmanned vehicle 2 according to the embodiment in the loading area 4 when the GNSS is unavailable.

For example, when the GNSS becomes unavailable due to ionospheric scintillation or the like, the sensor data reception unit 123 cannot receive the detection data of the self-position sensor 17 indicating the GNSS position of the unmanned vehicle 2 and the detection data of the self-position sensor 22 indicating the GNSS position of the loader 7. The sensor data reception unit 123 determines that the GNSS position cannot be acquired (Step SA1).

When the sensor data reception unit 123 cannot receive the detection data of the self-position sensor 17 and the detection data of the self-position sensor 22, the entry-prohibited area setting unit 124 expands the entry-prohibited area 50 (Step SA2).

As illustrated in FIG. 6, when the GNSS is available, that is, when the sensor data reception unit 123 can receive the detection data of the self-position sensor 17 and the detection data of the self-position sensor 22, the entry-prohibited area 50 is set to an entry-prohibited area 50A having a first size. As illustrated in FIG. 8, when the GNSS is unavailable, that is, when the sensor data reception unit 123 cannot receive the detection data of the self-position sensor 17 and the detection data of the self-position sensor 22, the entry-prohibited area setting unit 124 expands the entry-prohibited area 50 from the entry-prohibited area 50A having a first size to the entry-prohibited area 50B having a second size larger than the first size.

When the GNSS is unavailable, each of plurality of the unmanned vehicles 2 (2A, 2B) operating in the work site 1 transmits the matching position to the management device 12. As described above, the self-position calculation unit 93 of the unmanned vehicle 2 can calculate the matching position of the unmanned vehicle 2 defined in the global coordinate system based on the map data of the work site 1 and the detection data of the target position sensor 20. The sensor data reception unit 123 acquires the matching position of the unmanned vehicle 2 from each of the plurality of unmanned vehicles 2 (2A, 2B).

When the GNSS is unavailable, that is, when the sensor data reception unit 123 cannot receive the detection data of the self-position sensor 17 and the detection data of the self-position sensor 22, the travel path generation unit 121 generates a fourth travel path 32D which is the travel path 32 to a monitoring point 43 defined around the loader 7 in the loading area 4 (Step SA3).

As illustrated in FIG. 8, the monitoring point 43 is defined outside the entry-prohibited area 50B. Furthermore, the monitoring point 43 is defined at a position not overlapping with the third travel path 32C which is the existing travel path 32 in the loading area 4.

The travel path transmission unit 122 transmits the fourth travel path 32D generated by the travel path generation unit 121 to a specific unmanned vehicle 2 among the plurality of unmanned vehicles 2 operating in the work site 1. The travel path transmission unit 122 transmits the fourth travel path 32D to, for example, the unmanned vehicle 2 present at a position closest to the loading point 42 among the plurality of unmanned vehicles 2. Note that the travel path transmission unit 122 may transmit the fourth travel path 32D to the unmanned vehicle 2 present at a position closest to the switchback point 41 among the plurality of unmanned vehicles 2. The travel path transmission unit 122 may transmit the fourth travel path 32D to the unmanned vehicle 2 present at the entrance of the loading area 4 among the plurality of unmanned vehicles 2.

In the following description, the unmanned vehicle 2 to which the fourth travel path 32D to the monitoring point 43 is transmitted is referred to as a first unmanned vehicle 2A as appropriate. In addition, the unmanned vehicle 2 following the first unmanned vehicle 2A is referred to as a second unmanned vehicle 2B as appropriate, and the unmanned vehicle 2 following the second unmanned vehicle 2B is referred to as a third unmanned vehicle 2C as appropriate.

The first unmanned vehicle 2A to which the fourth travel path 32D is transmitted travels toward the monitoring point 43 according to the fourth travel path 32D. The first unmanned vehicle 2A travels based on the matching position. That is, the first unmanned vehicle 2A moves toward the monitoring point 43 using the scan matching navigation (Step SB1).

As illustrated in FIG. 9, the first unmanned vehicle 2A arranged at the monitoring point 43 detects the relative position with respect to the loader 7 using the target position sensor 20. The monitoring point 43 is defined such that the loader 7 is arranged in the detection range of the target position sensor 20. In a state where the first unmanned vehicle 2A stops at the monitoring point 43, the relative position between the first unmanned vehicle 2A and the loader 7 is detected by the target position sensor 20. The target position calculation unit 94 acquires the detection data of the target position sensor 20 indicating the relative position between the first unmanned vehicle 2A and the loader 7 (Step SB2).

The target position calculation unit 94 calculates the matching position of the first unmanned vehicle 2A while the target position sensor 20 is detecting the loader 7. The target position calculation unit 94 calculates the position of the loader 7 based on the matching position of the first unmanned vehicle 2A and the detection data of the target position sensor 20. The matching position of the first unmanned vehicle 2A is the absolute position. Thus, the target position calculation unit 94 calculates the absolute position of the loader 7 based on the matching position of the first unmanned vehicle 2A and the detection data of the target position sensor 20 (Step SB3).

The target position calculation unit 94 transmits the position of the loader 7 calculated in Step SB3 to the management device 12 via the communication system 13. The position acquisition unit 125 acquires, from the first unmanned vehicle 2A, the position of the loader 7 calculated based on the detection data of the target position sensor 20.

When the position acquisition unit 125 acquires the position of the loader 7, the entry-prohibited area setting unit 124 stops the expansion of the entry-prohibited area 50. In the embodiment, when the position acquisition unit 125 acquires the position of the loader 7, the entry-prohibited area setting unit 124 reduces the entry-prohibited area 50. As illustrated in FIG. 9, when the position acquisition unit 125 acquires the position of the loader 7, the entry-prohibited area setting unit 124 returns the entry-prohibited area 50B to the entry-prohibited area 50A that is set when the sensor data reception unit 123 can receive the detection data of the self-position sensor 17 and the detection data of the self-position sensor 22. The entry-prohibited area setting unit 124 returns the entry-prohibited area 50B to the entry-prohibited area 50A that is set when the GNSS is available.

The operator of the loader 7 operates a transmission device (not illustrated) mounted on the loader 7 to transmit, to the management device 12, a moving command for causing the second unmanned vehicle 2B to move to the loading point 42.

The travel path transmission unit 122 transmits, to the second unmanned vehicle 2B, the third travel path 32C which is the travel path 32 to the loading point 42.

As illustrated in FIG. 9, the second unmanned vehicle 2B to which the third travel path 32C is transmitted travels toward the loading point 42 according to the third travel path 32C. The second unmanned vehicle 2B travels based on the matching position. That is, the second unmanned vehicle 2B moves toward the loading point 42 using the scan matching navigation (Step SC1).

The operator of the loader 7 starts the loading work of loading loads onto the dump body 203 of the second unmanned vehicle 2B arranged at the loading point 42 (Step SD1).

After the completion of the loading work, the operator of the loader 7 operates the transmission device (not illustrated) mounted on the loader 7 to transmit, to the management device 12, a leaving command for causing the second unmanned vehicle 2B to leave the loading point 42.

The travel path transmission unit 122 transmits, to the second unmanned vehicle 2B, the travel path 32 for leaving the loading point 42.

The second unmanned vehicle 2B leaves the loading point 42 based on the travel path 32. The second unmanned vehicle 2B travels based on the matching position. That is, the second unmanned vehicle 2B travels so as to leave the loading point 42 using the scan matching navigation (Step SC1).

The first unmanned vehicle 2A continuously detects the position of the loader 7 using the target position sensor 20 at the monitoring point 43, for example, until the GNSS becomes available. During a period in which the position of the loader 7 is being continuously detected by the target position sensor 20 of the first unmanned vehicle 2A, the loading work onto the plurality of unmanned vehicles 2 is sequentially performed. For example, after the second unmanned vehicle 2B leaves the loading point 42, the third unmanned vehicle 2C next to the second unmanned vehicle 2B travels to the loading point 42 based on the third travel path 32C.

Effects

As described above, the management system 11 of the unmanned vehicle 2 according to the embodiment includes the first unmanned vehicle 2A including the target position sensor 20 that detects the relative position with respect to the loader 7, the second unmanned vehicle 2B including the dump body 203 onto which loads are loaded by the loader 7, and the management device 12 that manages the travel of each of the first unmanned vehicle 2A and the second unmanned vehicle 2B.

According to the embodiment, even when the GNSS is unavailable, the management system 11 can acquire the position of the loader 7 using the target position sensor 20 of the first unmanned vehicle 2A. Thus, the second unmanned vehicle 2B can enter the loading point 42 based on the position of the loader 7. Even when the GNSS is unavailable, the loads can be loaded onto the dump body 203 of the second unmanned vehicle 2B using the loader 7, so that it is possible to suppress a decrease in productivity at the work site 1.

When the GNSS is unavailable, the travel path generation unit 121 generates the fourth travel path 32D to the monitoring point 43 defined around the loader 7. The travel path transmission unit 122 transmits, to the first unmanned vehicle 2A, the fourth travel path 32D to the monitoring point 43. Thus, the first unmanned vehicle 2A can monitor the loader 7 using the target position sensor 20 at an appropriate position at which the loading work onto the second unmanned vehicle 2B is not obstructed.

By setting, for the loader 7, the entry-prohibited area 50 in which the unmanned vehicle 2 is prohibited from entering, the contact between the unmanned vehicle 2 and the loader 7 is suppressed. The entry-prohibited area 50 is once expanded when the GNSS is unavailable, and thus, even in a scene where the GNSS is unavailable, the contact between the unmanned vehicle 2 and the loader 7 is suppressed.

When the position of the loader 7 is calculated based on the detection data of the target position sensor 20, the expansion of the entry-prohibited area 50 is stopped. In the embodiment, the entry-prohibited area 50B having the second size is returned to the entry-prohibited area 50A having the first size. If the entry-prohibited area 50 remains expanded, the unmanned vehicle 2 does not approach the loader 7, making it difficult to perform the loading work. When the position of the loader 7 is calculated based on the detection data of the target position sensor 20, the entry-prohibited area 50 is reduced, so that the unmanned vehicle 2 can enter the loading point 42. Accordingly, the loading work is performed. Thus, the decrease in productivity at the work site 1 is suppressed.

Another Embodiment

In the above-described embodiment, the loader 7 may not include the self-position sensor 22 (GNSS receiver). The position acquisition unit 125 may acquire the position of the loader 7 calculated based on the detection data of the target position sensor 20 from the first unmanned vehicle 2A, and the travel path generation unit 121 may generate the travel path 32 to the loading point 42 based on the position of the loader 7 acquired by the position acquisition unit 125. The travel path transmission unit 122 may transmit, to the second unmanned vehicle 2B, the travel path 32 to the loading point 42 generated by the travel path generation unit 121.

In the above-described embodiment, when the GNSS is unavailable, the monitoring point 43 is defined at a position not overlapping with the existing third travel path 32C in the loading area 4, and the second unmanned vehicle 2B enters the loading point 42 based on the existing third travel path 32C. The monitoring point 43 may be defined so as to overlap with the existing third travel path 32C.

Figure 10:
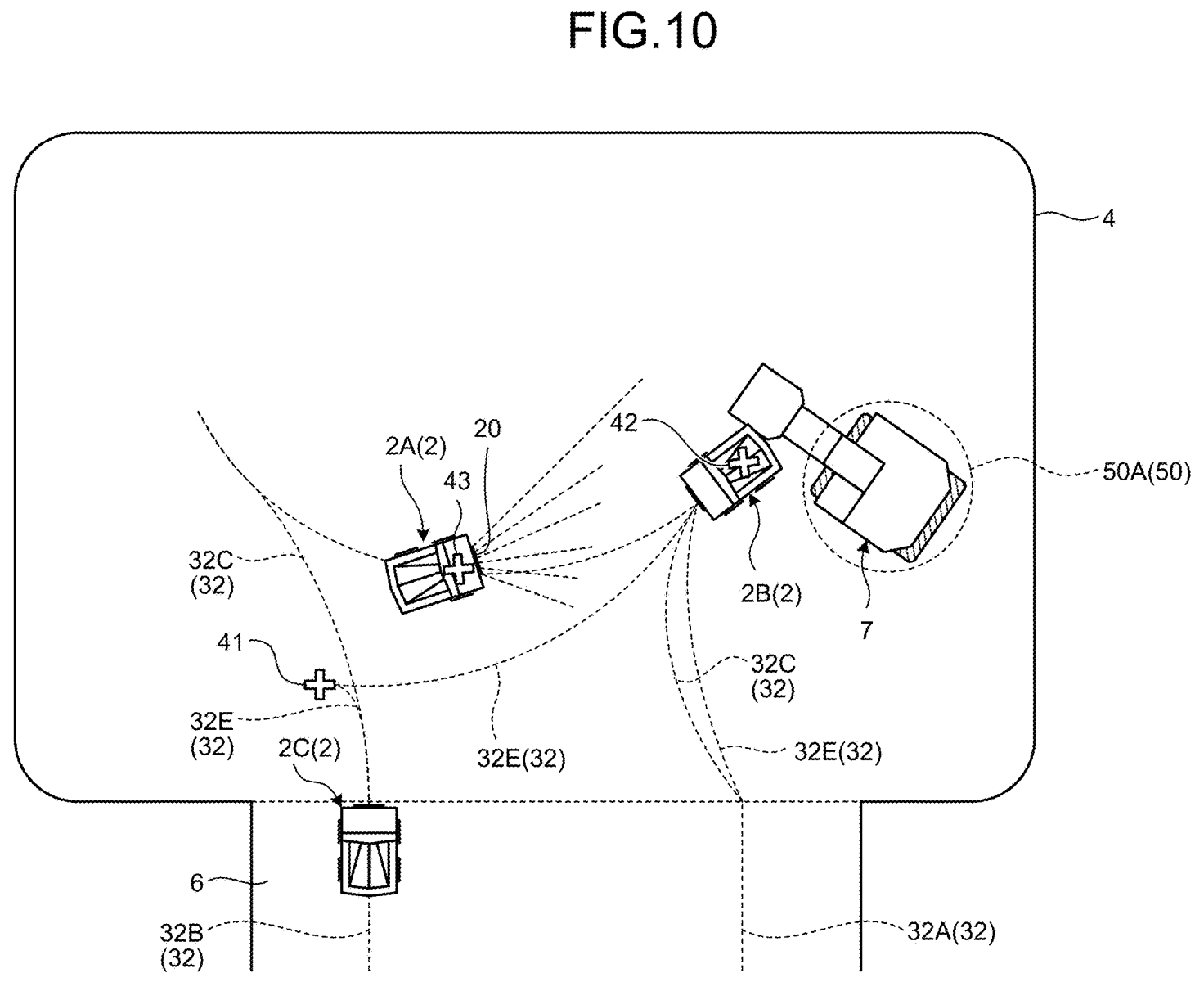

FIG. 10 is a schematic diagram for explaining an operation of the unmanned vehicle 2 according to another embodiment in the loading area 4 when the GNSS is unavailable. When the GNSS is unavailable, that is, when the sensor data reception unit 123 cannot receive the detection data of the self-position sensor 17 and the detection data of the self-position sensor 22, the travel path generation unit 121 may generate a fifth travel path 32E which is the travel path 32 to the loading point 42 based on the position of the loader 7 acquired by the position acquisition unit 125. The monitoring point 43 may be defined so as to overlap with the existing third travel path 32C. The travel path generation unit 121 may newly generate the fifth travel path 32E to the loading point 42 so as to avoid the existing third travel path 32C and the monitoring point 43. The travel path transmission unit 122 may transmit, to the second unmanned vehicle 2B, the newly generated fifth travel path 32E to the loading point 42. The second unmanned vehicle 2B may enter the loading point 42 based on the newly generated fifth travel path 32E.

In the above-described embodiment, the first unmanned vehicle 2A which is an unmanned dump truck monitors the position of the loader 7 at the monitoring point 43. The unmanned vehicle that monitors the position of the loader 7 at the monitoring point 43 may not be an unmanned dump truck. That is, the unmanned vehicle that monitors the position of the loader 7 at the monitoring point 43 does not need to include a dump body, and may be any unmanned work machine.

In the above-described embodiment, at least a part of the functions of the management device 12 may be provided in the control device 9, or at least a part of the functions of the control device 9 may be provided in the management device 12. For example, the function of the map creation unit 126 and the function of the map storage unit 127 may be provided in the control device 9. The function of the target position calculation unit 94 may be provided in the management device 12.

In the above-described embodiment, each of the travel path generation unit 121, the travel path transmission unit 122, the sensor data reception unit 123, the entry-prohibited area setting unit 124, the position acquisition unit 125, the map creation unit 126, and the map storage unit 127 may be configured by separate hardware (computer system). In addition, each of the travel path acquisition unit 91, the sensor data acquisition unit 92, the self-position calculation unit 93, the target position calculation unit 94, and the travel control unit 95 may be configured by separate hardware (computer system).

In the above-described embodiment, the unmanned vehicle 2 is a dump truck which is a type of a haul vehicle. The unmanned vehicle 2 may be any work vehicle capable of performing work at the work site 1.

REFERENCE SIGNS LIST

1 WORK SITE
2 UNMANNED VEHICLE
2A FIRST UNMANNED VEHICLE
2B SECOND UNMANNED VEHICLE
2C THIRD UNMANNED VEHICLE
3 TRAVEL AREA
4 LOADING AREA
5 DISCHARGING AREA
6 TRAVEL ROAD
7 LOADER
8 CRUSHER
9 CONTROL DEVICE
10 CONTROL DEVICE
11 MANAGEMENT SYSTEM
12 MANAGEMENT DEVICE
13 COMMUNICATION SYSTEM
13A WIRELESS COMMUNICATION DEVICE
13B WIRELESS COMMUNICATION DEVICE
13C WIRELESS COMMUNICATION DEVICE
14 CONTROL FACILITY
17 SELF-POSITION SENSOR
18 AZIMUTH SENSOR
19 SPEED SENSOR
20 TARGET POSITION SENSOR
22 SELF-POSITION SENSOR
31 TRAVEL POINT
32 TRAVEL PATH
32A FIRST TRAVEL PATH
32B SECOND TRAVEL PATH
32C THIRD TRAVEL PATH
32D FOURTH TRAVEL PATH
32E FIFTH TRAVEL PATH
41 SWITCHBACK POINT
42 LOADING POINT
43 MONITORING POINT
50 ENTRY-PROHIBITED AREA
50A ENTRY-PROHIBITED AREA
50B ENTRY-PROHIBITED AREA
91 TRAVEL PATH ACQUISITION UNIT
92 SENSOR DATA ACQUISITION UNIT
93 SELF-POSITION CALCULATION UNIT
94 TARGET POSITION CALCULATION UNIT
95 TRAVEL CONTROL UNIT
101 SENSOR DATA ACQUISITION UNIT
102 SELF-POSITION CALCULATION UNIT
121 TRAVEL PATH GENERATION UNIT
122 TRAVEL PATH TRANSMISSION UNIT
123 SENSOR DATA RECEPTION UNIT
124 ENTRY-PROHIBITED AREA SETTING UNIT
125 POSITION ACQUISITION UNIT
126 MAP CREATION UNIT
127 MAP STORAGE UNIT
201 VEHICLE BODY
202 TRAVEL DEVICE
203 DUMP BODY
701 TURNING BODY
702 TRAVEL DEVICE
703 WORKING EQUIPMENT
703A BOOM
703B ARM
703C BUCKET
704 WORKING EQUIPMENT CYLINDER
704A BOOM CYLINDER
704B ARM CYLINDER
704C BUCKET CYLINDER
1000 COMPUTER SYSTEM
1001 PROCESSOR
1002 MAIN MEMORY
1003 STORAGE
1004 INTERFACE

The invention claimed is:

1. An unmanned vehicle management system comprising:

a first unmanned vehicle including a target position sensor that detects a relative position with respect to a loader;

a second unmanned vehicle including a dump body onto which a load is loaded by the loader; and a management device that manages travel of each of the first unmanned vehicle and the second unmanned vehicle, wherein the management device generates a travel path of the second unmanned vehicle based on position information of the loader transmitted from the first unmanned vehicle.

2. The unmanned vehicle management system according to claim 1, wherein the loader includes a self-position sensor that detects a position of the loader, and the management device includes a sensor data reception unit that receives detection data of the self-position sensor, a travel path generation unit that generates a travel path to a monitoring point defined around the loader when the sensor data reception unit cannot receive the detection data of the self-position sensor, and a travel path transmission unit that transmits, to the first unmanned vehicle, the travel path to the monitoring point.

3. The unmanned vehicle management system according to claim 1, wherein the loader includes a self-position sensor that detects a position of the loader, and the management device includes a sensor data reception unit that receives detection data of the self-position sensor, and an entry-prohibited area setting unit that sets, for the loader, an entry-prohibited area in which an unmanned vehicle is prohibited from entering, and the entry-prohibited area setting unit expands the entry-prohibited area when the sensor data reception unit cannot receive the detection data of the self-position sensor.

4. The unmanned vehicle management system according to claim 3, wherein the management device includes a position acquisition unit that acquires, from the first unmanned vehicle, a position of the loader calculated based on detection data of the target position sensor, and the entry-prohibited area setting unit reduces the entry-prohibited area when the position acquisition unit acquires the position of the loader.

5. The unmanned vehicle management system according to claim 4, wherein when the position acquisition unit acquires the position of the loader, the entry-prohibited area setting unit reduces the entry-prohibited area, to an entry-prohibited area that is set when the sensor data reception unit can receive the detection data of the self-position sensor.

6. The unmanned vehicle management system according to claim 1, wherein the management device includes a position acquisition unit that acquires, from the first unmanned vehicle, a position of the loader calculated based on detection data of the target position sensor, a travel path generation unit that generates a travel path to a loading point based on the position of the loader acquired by the position acquisition unit, and a travel path transmission unit that transmits, to the second unmanned vehicle, the travel path to the loading point.

7. The unmanned vehicle management system according to claim 3, wherein the management device includes a position acquisition unit that acquires, from the first unmanned vehicle, a position of the loader calculated based on detection data of the target position sensor, a travel path generation unit that newly generates a travel path to a loading point based on the position of the loader acquired by the position acquisition unit when the sensor data reception unit cannot receive the detection data of the self-position sensor, and a travel path transmission unit that transmits, to the second unmanned vehicle, the travel path to the loading point.

8. The unmanned vehicle management system according to claim 1, wherein the target position sensor includes a laser sensor, and the first unmanned vehicle includes a target position calculation unit that calculates a position of the loader based on detection data of the target position sensor.

9. The unmanned vehicle management system according to claim 1, wherein the loader is an excavator including a turning body and working equipment supported by the turning body.

10. An unmanned vehicle management method comprising:

detecting a relative position with respect to a loader by a target position sensor included in a first unmanned vehicle;

loading a load onto a dump body included in a second unmanned vehicle by the loader;

managing travel of each of the first unmanned vehicle and the second unmanned vehicle; and generating a travel path of the second unmanned vehicle based on position information of the loader transmitted from the first unmanned vehicle.

11. The unmanned vehicle management method according to claim 10, comprising:

receiving detection data of a self-position sensor that detects a position of the loader;

generating a travel path to a monitoring point defined around the loader when the detection data of the self-position sensor cannot be received; and transmitting, to the first unmanned vehicle, the travel path to the monitoring point.

12. The unmanned vehicle management method according to claim 10, comprising:

receiving detection data of a self-position sensor that detects a position of the loader;

setting, for the loader, an entry-prohibited area in which an unmanned vehicle is prohibited from entering; and expanding the entry-prohibition area when the detection data of the self-position sensor cannot be received.

13. The unmanned vehicle management method according to claim 12, comprising:

acquiring, from the first unmanned vehicle, a position of the loader calculated based on detection data of the target position sensor; and reducing the entry-prohibited area when the position of the loader is acquired.

14. The unmanned vehicle management method according to claim 13, wherein when the position of the loader is acquired, the entry-prohibited area is reduced to an entry-prohibited area that is set when the detection data of the self-position sensor can be received.

15. The unmanned vehicle management method according to claim 10, comprising:

acquiring, from the first unmanned vehicle, a position of the loader calculated based on detection data of the target position sensor;

generating a travel path to a loading point based on the position of the loader; and transmitting, to the second unmanned vehicle, the travel path to the loading point.

16. The unmanned vehicle management method according to claim 12, comprising:

acquiring, from the first unmanned vehicle, a position of the loader calculated based on detection data of the target position sensor;

newly generating a travel path to a loading point based on the position of the loader when the detection data of the self-position sensor cannot be received; and transmitting, to the second unmanned vehicle, the travel path to the loading point.

17. The unmanned vehicle management method according to claim 10, wherein the target position sensor includes a laser sensor, and a position of the loader is calculated based on detection data of the target position sensor.

18. The unmanned vehicle management method according to claim 10, wherein the loader is an excavator including a turning body and working equipment supported by the turning body.

* * * * *